F. K. VIAL.
CAR WHEEL.
APPLICATION FILED JUNE 1, 1909.

994,350.

Patented June 6, 1911.
2 SHEETS—SHEET 1.

Witnesses:
John Enders
Chas. H. Buell.

Inventor:
Frederick K. Vial.
By Sheridan, Wilkinson & Scott,
Attys.

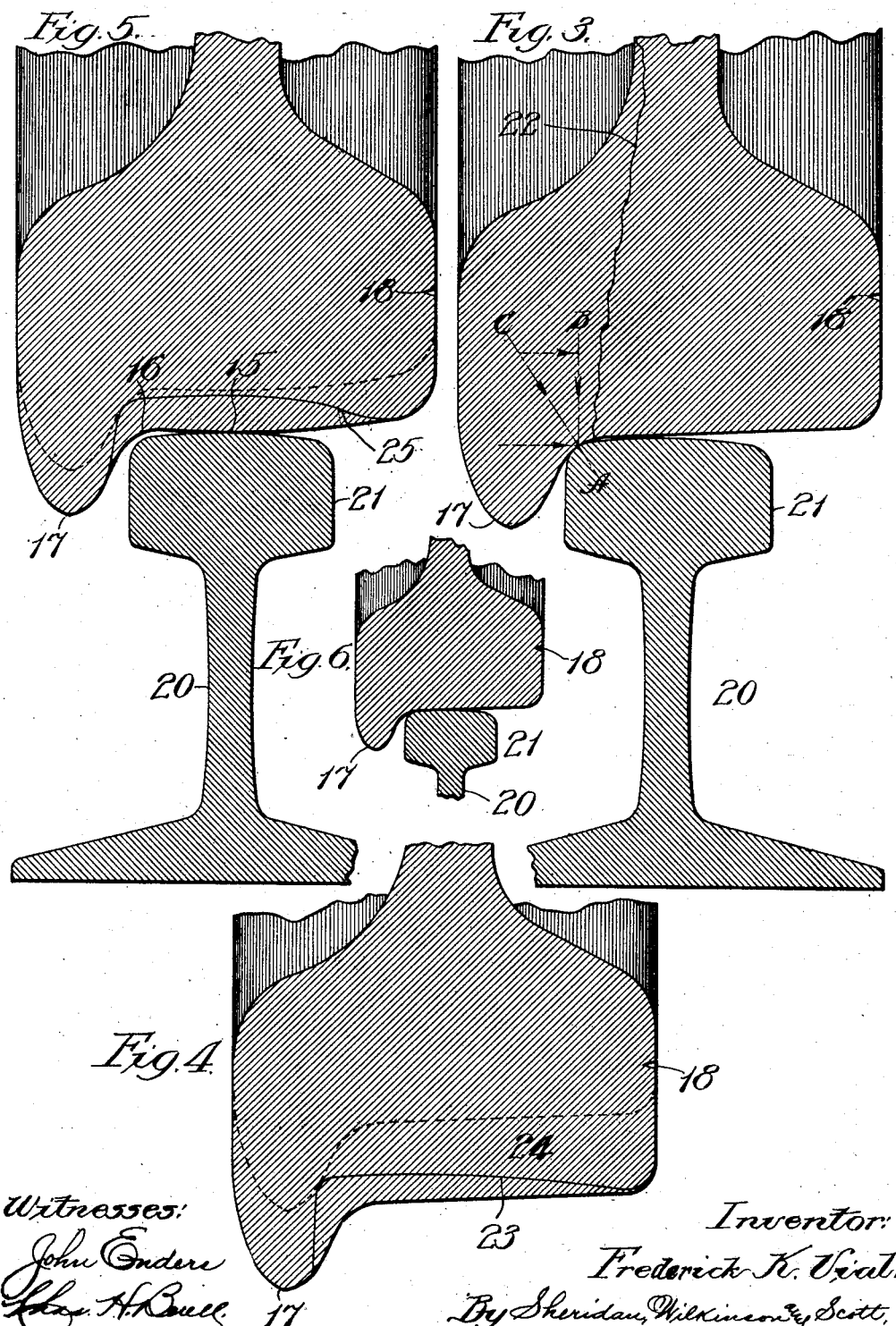

UNITED STATES PATENT OFFICE.

FREDERICK K. VIAL, OF CHICAGO, ILLINOIS, ASSIGNOR TO GRIFFIN WHEEL COMPANY, A CORPORATION OF ILLINOIS.

CAR-WHEEL.

994,350.  Specification of Letters Patent.  Patented June 6, 1911.

Original application filed April 3, 1909, Serial No. 487,796. Divided and this application filed June 1, 1909. Serial No. 499,565.

*To all whom it may concern:*

Be it known that I, FREDERICK K. VIAL, a citizen of the United States, residing at Chicago, in the county of Cook and State of Illinois, have invented certain new and useful Improvements in Car-Wheels, of which the following is a specification.

The principal object of my invention is to provide a new and improved car wheel.

Another object of my invention is to provide a car wheel with a tread surface so constructed as to wear for a long time.

Another object is to construct a car wheel with a tread surface so formed as to make the wheel coact with the rail to sustain the load in a proper manner.

Still another object is to provide a rolled, pressed or forged car wheel with a tread surface so formed as to wear advantageously and support the load in a proper manner.

With the foregoing objects in view as well as other objects which will be made more readily apparent in the following specification and accompanying drawings, my invention consists of the combination of elements stated in the appended claims.

In the accompanying drawings, I have disclosed one particular embodiment of my invention.

Figure 1:
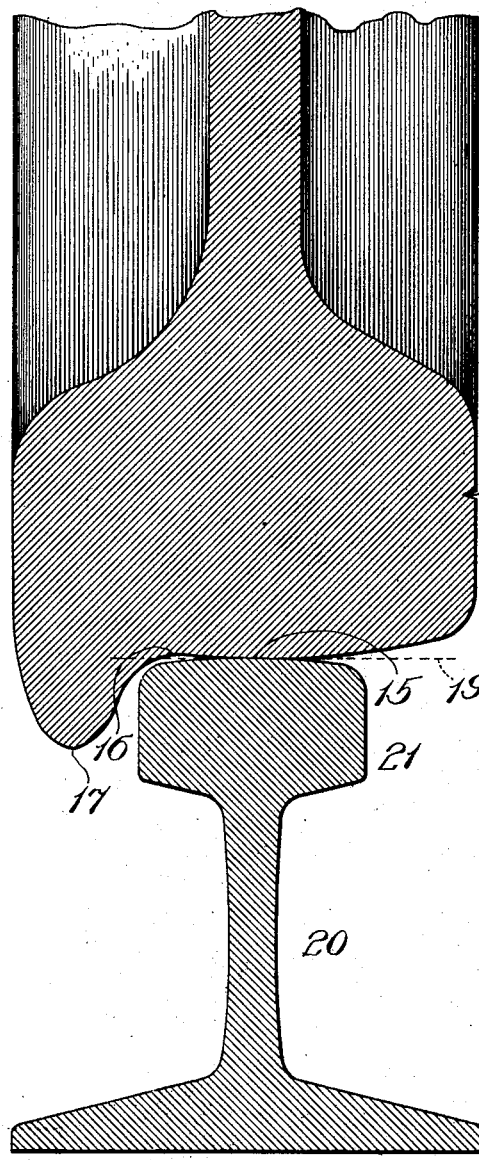
Figure 2:
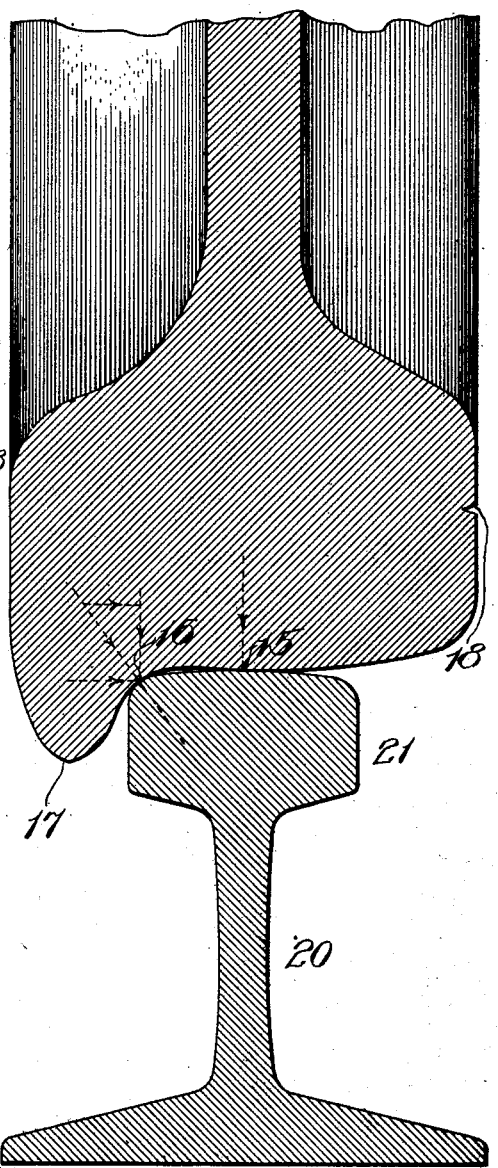

Referring to the drawings—Figure 1 shows a cross section of a car wheel tread embodying my invention. Fig. 2 shows the same in a diagram which will be referred to in explaining the stresses to which the wheel is subjected in use. Fig. 3 is a diagram showing the stresses to which the present style tapered tread car wheel is subject. Fig. 4 is a diagram of a present style wheel showing how it wears and how it must be turned down for renewed use. Fig. 5 is a corresponding diagram for my improved car wheel. Fig. 6 illustrates the normal position of present style wheel with reference to the rail.

My invention consists of an improvement in car wheels formed by rolling, pressing or forging, or by turning or grinding them to the desired shape.

The car wheel tread is shown in cross section in Fig. 1. The tread surface is convex at 15, and a concave throat is formed at 16 adjacent to the flange 17. The notch 18 indicates the limit to which the metal of the tread may be removed by wearing, grinding or turning before the wheel is condemned as unfit for further use. The transverse horizontal line 19 drawn tangent to the tread surface of the wheel meets it at an intermediate point because of the convexity 15. This point is substantially in the plane of the web 20 of the rail, and since it bears directly on the center of the head 21 of the rail, it follows that the load stress is transmitted directly and in a proper manner. Toward the flange 17, the tread surface recedes a little from the line 19 forming the concave throat 16. Thus it will be seen that the tread surface has its greatest diameter at an intermediate point, that is at the point 15. The structure may be otherwise described by stating that the diameter of the wheel is less in the throat adjacent to the flange than at a point more remote from the flange.

Among the advantages of this new structure for car wheels formed by rolling, pressing, or forging are the following: The weight of the load is carried centrally on the rail and more nearly at the center of the tread than in tapered wheels. With car wheels of the present tapered tread type, the whole weight of the load is carried on the part of wheel near the flange thereof, thus producing excessive wear on the rail at this point. This may be more fully explained in connection with Fig. 3 which shows the position of the ordinary car wheel with respect to the outside rail when passing around a curve; the same position is taken on tangents whenever there is a tendency for the wheel to run toward the rail. The vertical load on the wheel is represented by the line A—B. The horizontal thrust on the forward outside wheel in passing around a curve is approximately ¾ of the load carried by the wheel, and is represented by the line C—B. The resultant of these two forces is line A—C which amounts to an increase of 25% of the load carried. The contact of the wheel with the rail is shifted from the point shown in Fig. 6 to the point A shown in Fig. 3 which is the position of stable equilibrium inasmuch as the two surfaces in contact are at a right angle to the direction of the force. A part of the wheel of greater diameter is thus brought into contact with the rail, the difference in circumference being about four times as much as would be required to allow for the difference in length of inside and outside rail on the average curve used in railway practice. It necessarily follows that intense grinding takes place at the point A because of the increased load on the curved surface and the inequality of the circumferences of the wheels on the same axle at their respective points of contact with the rails and from the further fact that the load is concentrated on a very small area so that for a heavy car it exceeds the elastic limit of the metal in the wheel and rail. The load also being on the extreme corner of the rail results in a very rapid wearing away of the rail as well as the throat of the wheel. The excessive abrasion and pressure develops heat very rapidly in the wheel tread, which in connection with the severe stress in the metal, produces a dangerous condition of crystallization which often results in flange failures, as indicated by the reference numeral 22. My improved car wheel very largely eliminates these objectionable features as appears from Fig. 2. First, the pressure at the throat is reduced to the amount of the lateral thrust, the vertical load continuing to bear at or near the center of the rail, thereby largely increasing the contact area between wheel and rail. There is no increase in the effective diameter of the wheel, as the tendency for the wheel to rise above the normal position on the rail does not exist; therefore, the amount of slippage or grinding is very materially reduced, and since the pressure and slippage are reduced the abrasion of the rail and wheel must be correspondingly less. There will be less heat developed, and since the pressure is materially less there will be a corresponding reduction in the liability of fracture. Another feature of advantage is that the bearing of the wheel is near the center of the rail, regardless of whether the rail is strictly vertical or not. The wheels now made have straight treads slightly tapered. In this case the load is carried on one side of the rail, and if the rail is slightly tilted or out of position the load is transferred to the opposite side. The nature of the remedy afforded by my invention is clearly shown in Fig. 2.

Sometimes a wheel due to its own form or the structure of the car truck has a persistent tendency to run toward its rail. The present tapered form of tread increases the effective diameter of that wheel which runs toward the rail and decreases the effective diameter of its mate. This condition prevails on upward of 50% of the wheels in service, which necessarily causes one or other of the wheels to slip an amount equal to the difference in the effective circumference of the wheels while running on straight track. A difference of ⅛" in circumference or one tape size causes a slippage of six feet per mile which very rapidly increases the difference in diameter of the wheels on the same axle and greatly reduces the service which the wheels would otherwise be capable of rendering. It is evident that none of these conditions occur in wheels with convex treads according to my invention. By reason of the true rolling motion the train resistance is greatly reduced thus requiring less motive power than where the old type of wheels are used.

Owing to the fact that wheels constructed according to my invention are free to move sidewise without either rising or falling, it will be evident that after the wheels have been deflected from their normal position, they will be more easily guided back to their normal or central position than would be the case with wheels having tapered treads.

The part of the wheel which is first worn out in service, especially in rolled or forged wheels, is the flange. Because of the elimination of the grinding factor and also because of an increase of approximately 50% in the amount of metal worn away from the tread before the wheel can be condemned for wearing hollow the life of the wheel is greatly increased.

In car wheels having the structure disclosed by me, a large amount of material may be worn away from the tread surface before they become unfitted for use. It will be seen on referring to Fig. 1 that the convex tread surface must all be worn away before the tread surface becomes flat enough to rest evenly on the rail clear across. After that, further continued wear will form a depression in the tread surface which, in time, will increase until the limit allowed by good engineering practice has been reached. But it is obvious that a car wheel constructed as shown in Fig. 1 offers wear to a very considerable extent before any depression whatever is formed; to this extent the usefulness of the car wheels is increased. Moreover, the cars are kept in service for a greater proportion of the time, which is a very important consideration, for when a car wheel is condemned, the car to which it belongs may be out of service a long time in switching, waiting in the shop yards, &c.

In the manufacture of rolled, forged or pressed wheels with convex treads, as herein disclosed, the density of the metal is increased at the throat on account of compressing the metal there to form the concave throat. This results in giving a harder finish to the tread in the throat and thus makes this part of the wheel more durable than the throat in the old style tapered tread wheel. It is customary after a tapered tread wheel has become worn down to about the limit indicated by the line 23 in Fig. 4 to cut the tread away to again give it the proper shape. But, in order to get a sufficiently thick flange, it is necessary to cut the tread surface away in the space indicated by the reference numeral 24 much more than would otherwise be necessary. In my improved car wheel, the forming of the throat, with the necessary compression of metal produced thereby, hardens the metal at this point, so that the wear is somewhat as indicated in Fig. 5, where the line 25 indicates the contour of the wheel after it is worn away. Because of the hardened throat, the wear is not as deep there as in Fig. 4, and hence it is not necessary to cut away nearly as much metal in order to get a proper new flange.

In the following claims, I employ the term "forged" in a broad sense to distinguish from casting.

The invention herein disclosed is a specific modification of the invention disclosed and claimed as generic in my prior application Serial No. 487,796 filed April 3, 1909.

I claim:—

1. An article of manufacture consisting of a forged metal car wheel, the cross section of the tread thereof having a concave throat and a convex tread surface beyond the throat from the flange.

2. An article of manufacture consisting of a forged metal car wheel having a convex tread surface and having the density of the metal increased at the throat adjacent to the flange.

3. An article of manufacture consisting of a forged metal car wheel having the metal compressed so as to relatively increase its density in the throat adjacent to the flange.

4. An article of manufacture consisting of a metal car wheel having its tread surface convex in cross section and locally hardened in an integral portion thereof to increase its wear.

5. An article of manufacture consisting of a metal car wheel having its tread surface convex in cross section and locally modified in texture so as to increase its wear.

In testimony whereof, I have subscribed my name.

FREDERICK K. VIAL.

Witnesses:
HENRY A. PARKS,
ANNA L. WALTON.

---

Copies of this patent may be obtained for five cents each, by addressing the "Commissioner of Patents, Washington, D. C."